Figure 10:
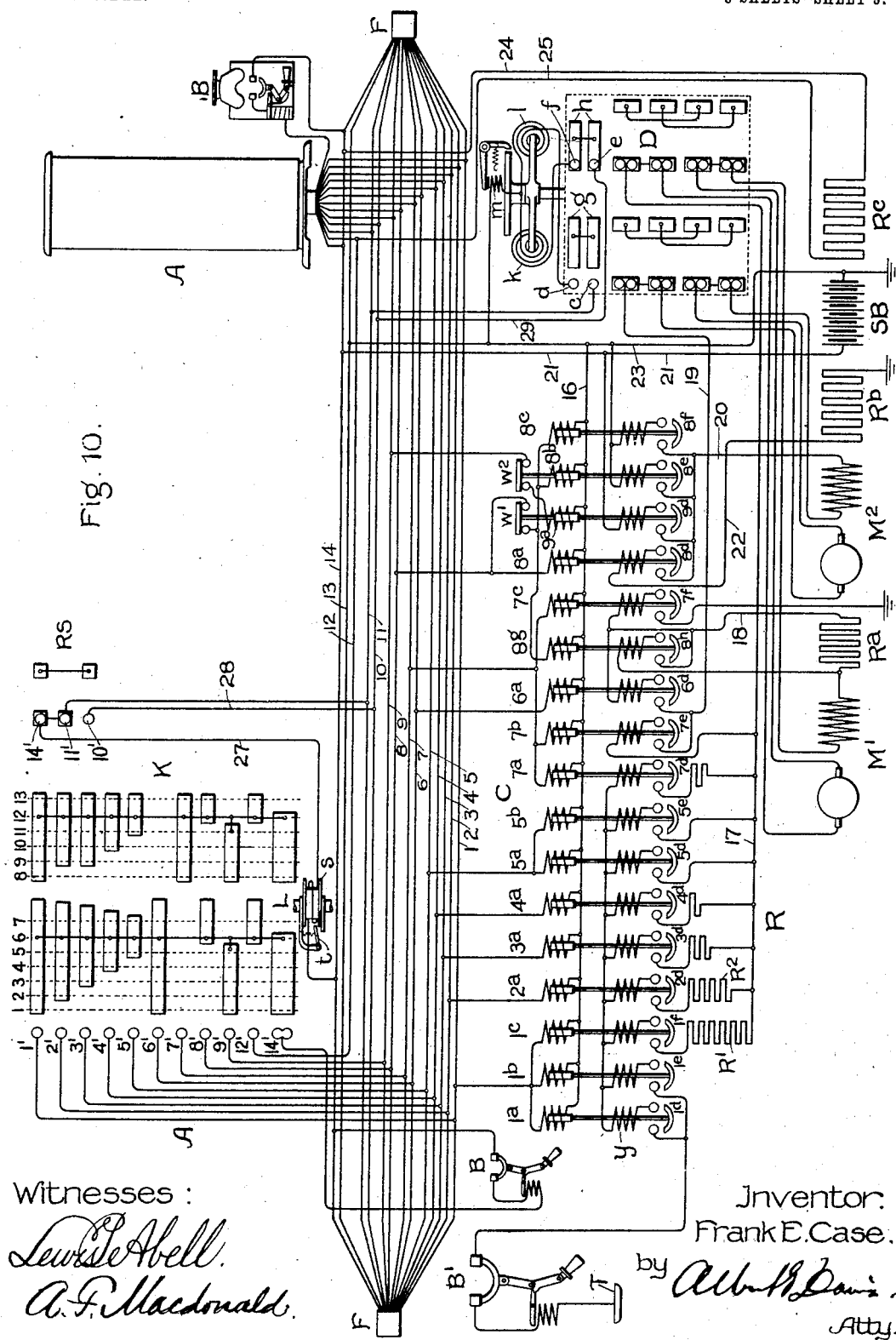

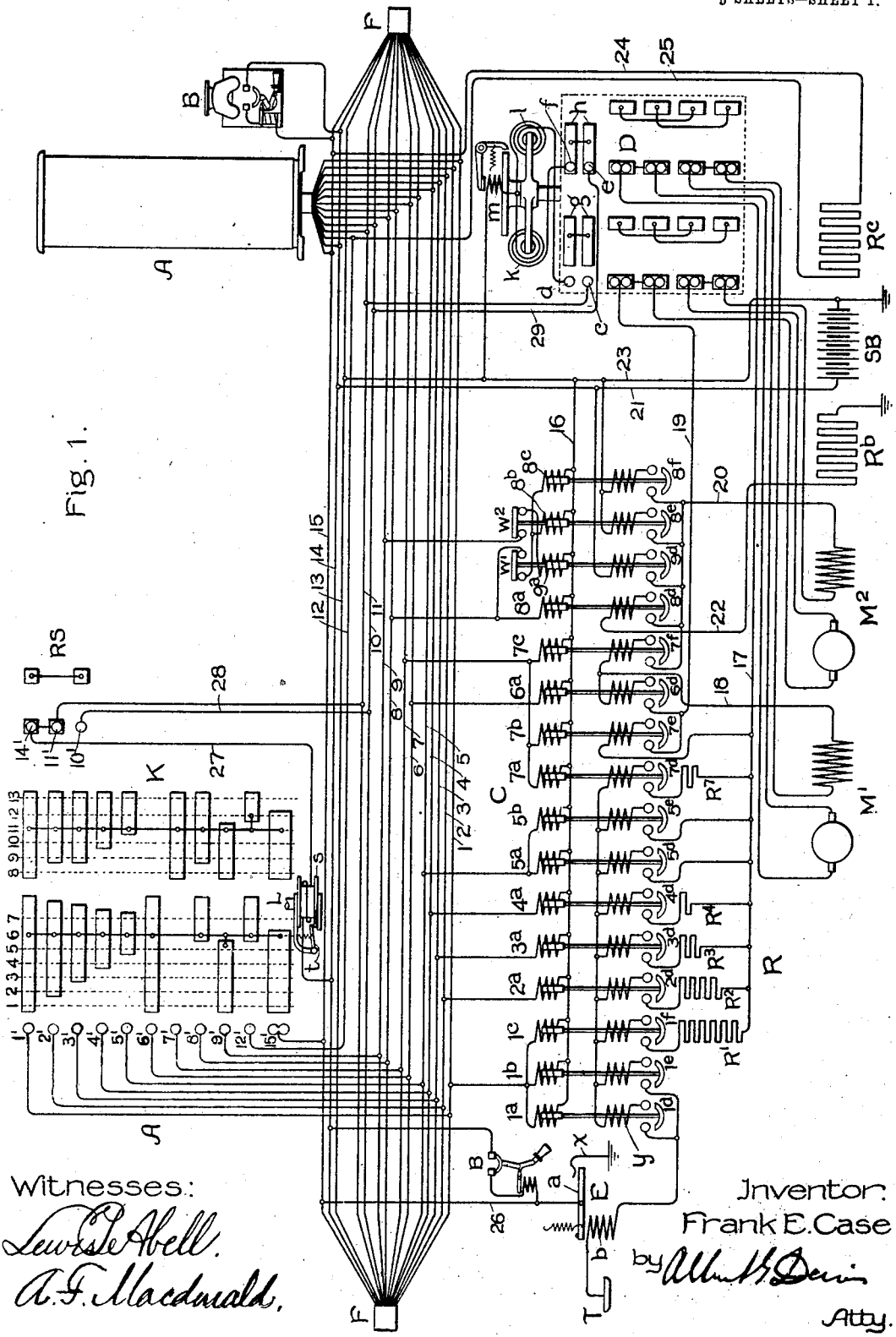

No. 730,341. PATENTED JUNE 9, 1903.
F. E. CASE.
SYSTEM OF MOTOR CONTROL.
APPLICATION FILED FEB. 12, 1900.
NO MODEL. 5 SHEETS—SHEET 2.
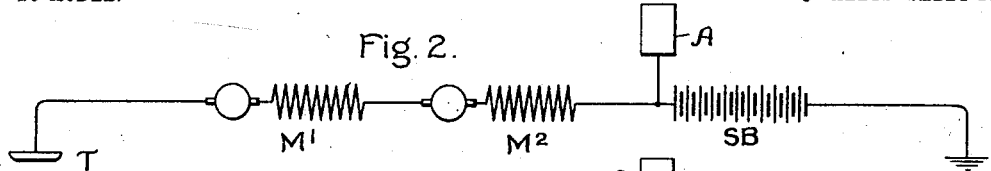
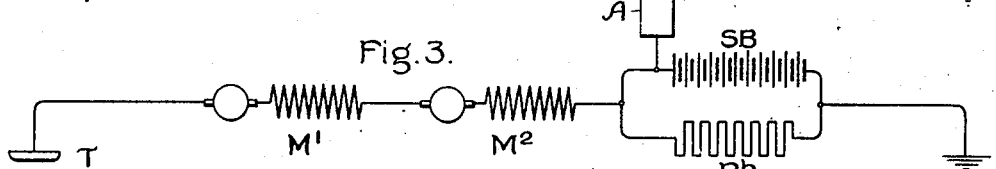
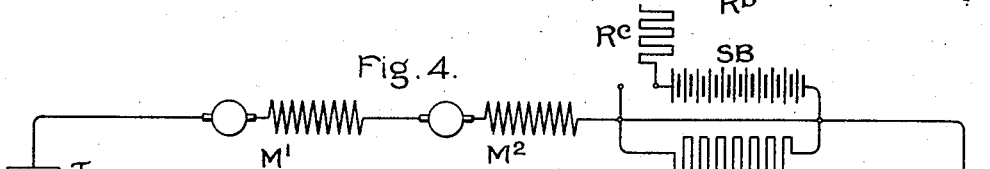
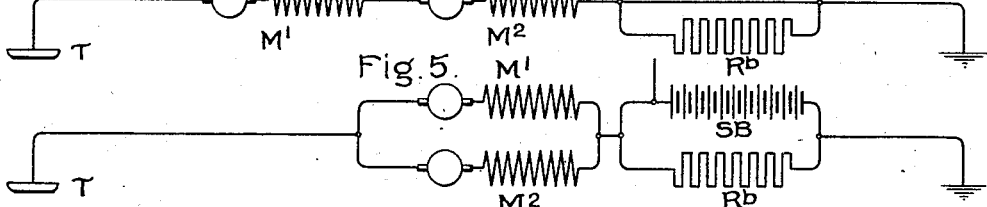
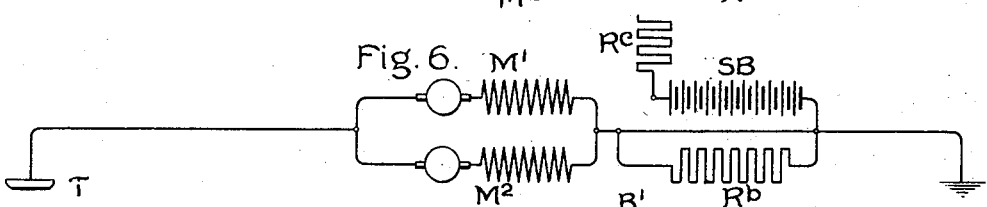
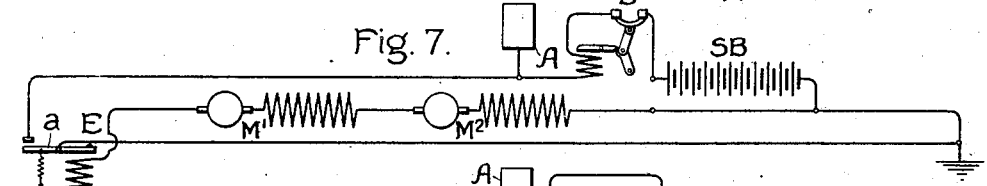
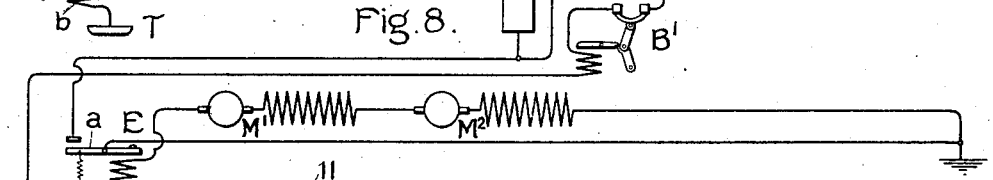
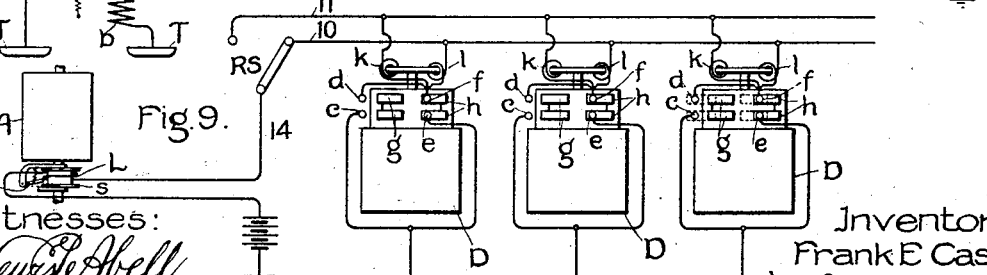
Witnesses:
Lewis E. Abell.
A. F. Macdonald.
Inventor:
Frank E. Case
by Albert G. Davis
Atty.

No. 730,341. PATENTED JUNE 9, 1903.
F. E. CASE.
SYSTEM OF MOTOR CONTROL.
APPLICATION FILED FEB. 12, 1900.
NO MODEL. 5 SHEETS—SHEET 3.

Witnesses:
Lewis P. Abell.
A. F. Macdonald.

Inventor:
Frank E. Case,
by Albert B. Davis,
Atty.

No. 730,341. PATENTED JUNE 9, 1903.
F. E. CASE.
SYSTEM OF MOTOR CONTROL.
APPLICATION FILED FEB. 12, 1900.
NO MODEL. 5 SHEETS—SHEET 4.
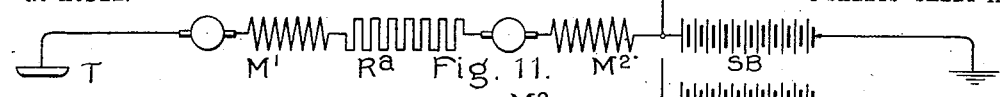
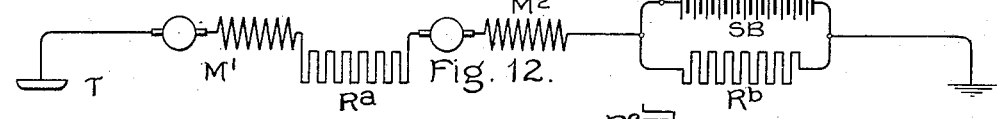
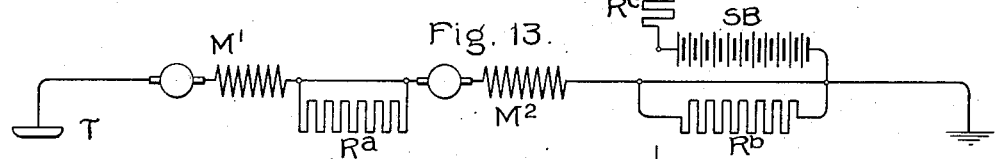
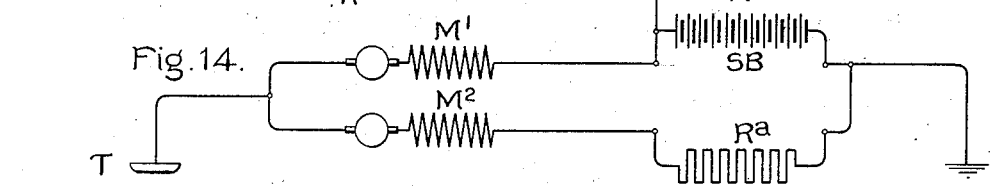
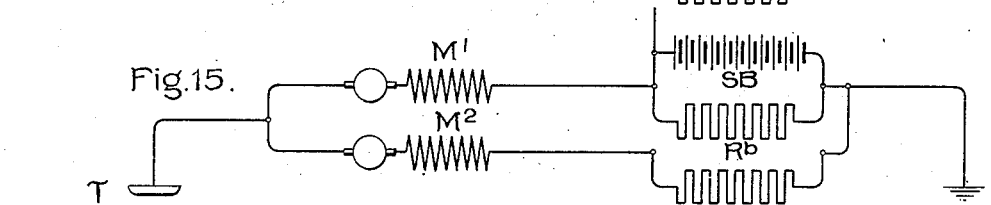
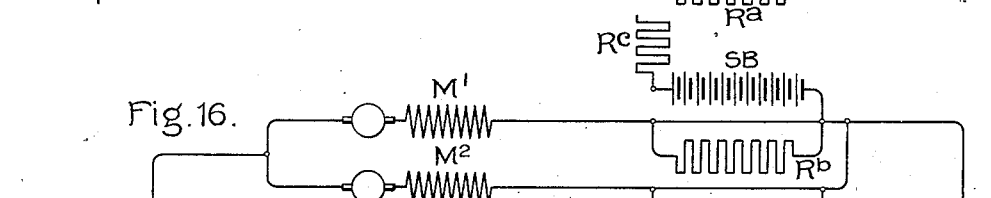
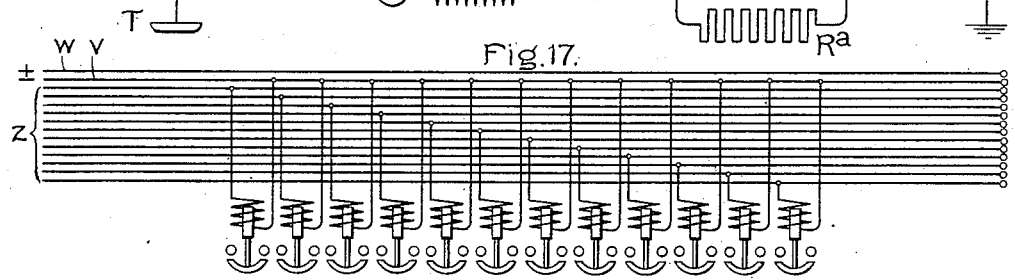
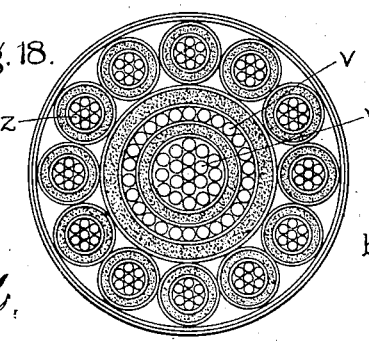
Witnesses:
Lewis P. Abell.
A. F. Macdonald.
Inventor:
Frank E. Case.
by Albert G. Davis
Atty
THE NORRIS PETERS CO., PHOTO-LITHO., WASHINGTON, D. C.

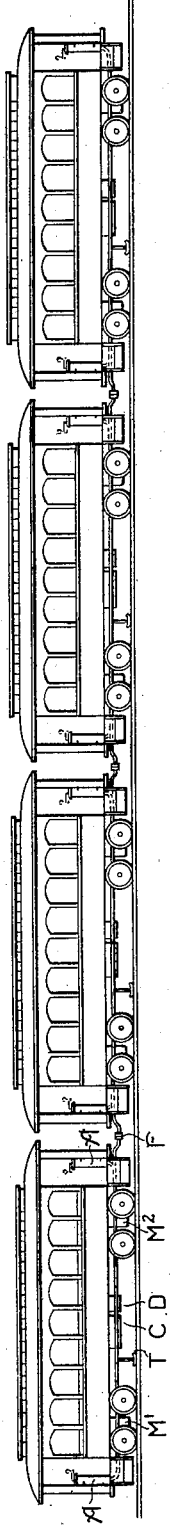

No. 730,341. Patented June 9, 1903.

UNITED STATES PATENT OFFICE.

FRANK E. CASE, OF SCHENECTADY, NEW YORK, ASSIGNOR TO THE GENERAL ELECTRIC COMPANY, A CORPORATION OF NEW YORK.

SYSTEM OF MOTOR CONTROL.

SPECIFICATION forming part of Letters Patent No. 730,341, dated June 9, 1903.

Application filed February 12, 1900. Serial No. 4,877. (No model.)

*To all whom it may concern:*

Be it known that I, FRANK E. CASE, a citizen of the United States, residing at Schenectady, county of Schenectady, State of New York, have invented certain new and useful Improvements in Systems of Motor Control, of which the following is a specification.

My present invention relates to systems of control for electric motors, and is particularly adapted for use in electric-railway systems in which a number of cars carrying one or more propelling-motors are to be controlled from a single point.

Certain features of my invention are applicable to train-control systems in general, while others are limited in their application to those systems in which a storage battery is provided on one or more of the cars for supplying current to actuate the various controlling devices on the several cars.

In those systems employing a storage battery for actuating the controlling devices it has heretofore been customary to maintain the batteries in a charged condition by connecting them to line through a resistance or otherwise. It is one of the objects of my invention to so arrange and connect these batteries that they may be inserted in the motor-circuits and charged during the time that the train is accelerating, thereby utilizing energy that would otherwise be dissipated in heating resistances. Inasmuch as the battery must be in a condition to supply current to actuate the controlling devices even when it is connected in the charging-circuit it is essential that the several cells shall always be so connected as to furnish an electromotive force great enough to supply the current requisite for operating the controlling devices, and in practice I find it advisable to make permanent connections between the several cells, so that the battery constitutes a unit, having at all times a certain definite electromotive force. In carrying out this feature of my invention I take the now well-known system, comprising controllers and storage batteries on the several motor-cars of a train connected to train-conductors leading to a master-controller or master-controllers, and I so arrange the contacts of the motor and master controllers that the same battery which supplies current through the master-controller to operate the motor-controllers is in certain positions of the master-controller connected by the motor-controlling contacts into the motor-circuit for charging. In the first position of the master-controller the battery is connected in the motor-circuit in series with a resistance, which latter is gradually cut out by the movement of the controller. Upon further movement a resistance is shunted around the storage battery, and, finally, in the last position of the controller the storage battery is disconnected from the motor-circuit and the shunting resistance short-circuited. By so connecting the storage battery I render it possible to charge the same while the motors are accelerating. If the demand on the battery is excessive, it may be maintained in circuit permanently or for any desired length of time in the position in which it is shunted by a resistance.

Another feature of my invention also applicable to a train system employing a storage battery for actuating the motor-controllers, and especially applicable when the motor-controller consists of separate electromagnetically-actuated contacts, consists in so arranging the contacts of the master-controller that in the final position, after all the contacts of the motor-controller have been actuated, the current supplied by the storage battery to the electromagnets will be reduced to an amount just sufficient to maintain them in their closed position.

My invention also comprises an indicating and open-circuiting device for notifying the operator at the master-controller whenever an excessive current-flow exists in any one of the motor-circuits and for opening the circuits of all of the motors when such excessive current-flow occurs. In the embodiment of this feature of my invention which I have illustrated I employ an automatic circuit-breaking device adjacent to each master-controller and connected in circuit with the source from which the current for actuating the motor-controllers is supplied, and on each car I provide a device for short-circuiting the storage batteries through the tripping-coils of any of the said circuit-breaking devices which are closed, so that they will be actuated whenever the current in any of the motor-circuits exceeds a certain predetermined limit.

Another feature of my invention comprises means for operating one or more switches from a master-controller, in combination with a locking device which is actuated whenever any one of the switches fails to operate after the master-controller has been operated. As shown in the drawings, this feature of my invention is applied to the reversing-switches and operates to lock the power-switch of the master-controller whenever any one of the reversing-switches fails to operate.

My invention also includes a novel construction of cable containing the conductors connecting the motor and master controllers in a system of the character described and provides a construction that renders impossible the operation of the motor-controllers by a short circuit between the train-conductors.

My invention also comprises other features of invention, as will more clearly appear from the following description and the claims annexed thereto.

In the accompanying drawings, illustrating my invention, Figure 1 is a diagram showing the elements of a train-control system arranged according to my invention. Figs. 2 to 6, inclusive, are diagrams illustrating the storage-battery connections in different positions of the master-controller shown in Fig. 1. Figs. 7 and 8 are diagrams illustrating the connections for operating the circuit-breaker in the storage-battery circuit upon an overload in the motor-circuit. Fig. 9 is a diagram illustrating the operation of the locking device on the power-switch of the master-controller. Fig. 10 is a diagram showing a modified train-control system. Figs. 11 to 16, inclusive, are diagrams illustrating the storage-battery connections in different positions of the master-controller shown in Fig. 10. Fig. 17 illustrates diagrammatically a novel arrangement of conductors in a train-control system. Fig. 18 is a cross-section of a cable constructed according to the diagram shown in Fig. 17; and Fig. 19 is a diagrammatic view of a train of cars, showing the application of my motor-control system thereto.

Referring to Fig. 1 of the drawings, the numerals 1 to 15, inclusive, indicate the train wires or conductors, which extend through the train, these conductors being connected together from car to car by means of the couplings F in a manner now well known.

At A A are the master-controllers, connected to the train-conductors, preferably one at each end of each car and comprising the power-switch K and the reversing-switch RS. In certain of the claims I have designated the two switches of the master-controller by the expression "a plurality of controlling-switches." The master-controller at the left in Fig. 1 is shown in diagram, the contacts being developed on a plane surface, while the one at the right is shown merely in outline.

C represents a motor-controller of the separately-actuated contact-type, and D a reversing-switch of the ordinary type, for changing the relative connections of the armatures and fields of the motors M' and M². Both the controller and the reversing-switch are electromagnetically actuated and are operatively connected to certain of the train-conductors.

SB indicates the storage battery, which supplies current through the master-controller to operate the motor-controller and the reversing-switch.

$R^b$ and $R^c$ indicate resistances which are used in connection with the storage battery.

B is a circuit-breaker arranged in the storage-battery circuit between the positive train-conductor and the master-controller, and E is a controlling device for energizing the tripping-coil of the circuit-breaker B upon an overload in the main motor-circuit.

L is a locking device arranged in operative relation to the power-switch of the master-controller.

It is of course understood that the corresponding devices on the several cars of the train are similarly connected to the train-wires, so that the master-controller on any one of the cars operates the controlling and reversing switches on all the cars of the train. As heretofore stated, it is one of the objects of my invention to so arrange and connect the various storage batteries on the several cars of the train that they may be inserted in the motor-circuits and charged during the time that the train is accelerating. I have therefore so organized the motor-controller and the power-switch of the master-controller that the batteries will be thus connected. The circuits for the various positions of the master-controller may be traced as follows: With the power-switch K of the master-controller in its first operative position, with the contacts 1' to 15' lying along the dotted line 1, the contact 15' will be connected with each of the contacts 1', 6', and 9', and current will flow from the storage battery, one end of which is connected to ground through the conductor 21, to the train-conductor 14, through the circuit-breaker B to the train-conductor 15, and to the master-controller at contact 15', where it will divide, part flowing through the contact 1' to the train-conductor 1 and through the solenoids $1^a$, $1^b$, $1^c$ to the conductor 16, and thence by way of conductor 23 to ground, another portion flowing through the fixed contact 6' to the train-conductor 6, thence to the solenoid $6^a$, and to ground by way of conductors 16 and 23, as before, and a third portion flowing by way of fixed contact 9' to the train-conductor 9, and through the safety device $w^3$, hereinafter to be described, through the solenoid $9^a$ to the conductors 16 and 23, and thence to ground. The solenoids $1^a$, $1^b$, $1^c$, $6^a$, and $9^a$ will actuate the corresponding contact devices of the controller C and will close the main motor-circuit at $1^d$, $1^e$, $1^f$, $6^d$, and $9^d$, which circuit may be traced as follows: Starting from the trolley-shoe T, through the actuating-coil $b$ of the controlling device E, through the contacts $1^d$ $1^e$ in multiple to the contact $1^f$, thence through the section R' of the resistance R to the conductor 17, through the direct-connected contacts of the reversing-switch to the armature and field of the motor M', thence by way of conductor 18 to contact $6^d$, by way of conductor 19 through the direct-connected contacts of the reversing-switch to the motor $M^2$, and by way of conductor 20 through the contact $9^d$ to the conductor 21, and through the storage battery SB to ground. Each of the contacts of the motor-controller is provided with a blow-out coil $y$, which is traversed by the main current.

When the power-switch of the master-controller is moved into its second position, the resistance-section $R^2$ will be connected in multiple with the section R' in the motor-circuit, and further movement of the power-switch will operate to connect in other resistance-sections, until finally in position 5 all resistance will be cut out, and the connections will be those shown in Fig. 2 of the drawings, the two motors M' and $M^2$ being connected in series with each other and with the storage battery across the line. The storage battery is also connected at all times to the master-controller by way of train-conductors 14 and 15.

In the sixth position of the power-switch of the master-controller circuits will be closed from the storage battery through the contacts 8' and 12' to the train-conductors 8 and 12. The contact $8^d$ of the motor-controller C will therefore be operated; but the contacts $8^e$ and $8^f$ will not be operated, for the reason that the circuit from the conductor 8 to the solenoids $8^b$ and $8^c$ will be broken at $w'$, due to the fact that the contact $9^d$ is still closed. The closing of the contact $8^d$ operates to close a circuit from the conductor 20 through the conductor 22 and resistance $R^b$ directly to ground, thereby shunting the resistance $R^b$ around the storage battery SB. The motor-circuit connections for this position of the master-controller are shown in Fig. 3. If now the power-switch of the master-controller is moved to its seventh position, the circuit from the storage battery to the master-controller will be broken, first at the contact 9', and next at the contact 15'. The breaking of the circuit at the contact 9' deënergizes the solenoid $9^a$ and permits the contact $9^d$ to open. The opening of this contact closes a circuit from the train-conductor 8 by means of the safety device $w'$ through the solenoids $8^b$ and $8^c$, thereby actuating the contacts $8^e$ and $8^f$. The opening of the contact $9^d$ opens the circuit to the storage battery, so that the entire current in the motor-circuit flows momentarily through the resistance $R^b$ to ground; but as soon as the contact $9^d$ is opened the contacts $8^e$ and $8^f$ will have been actuated in the manner already explained to close a circuit from the conductor 20, through contacts $8^e$ and $8^f$ in multiple, and conductor 23 directly to ground, thereby short-circuiting the resistance $R^b$. By the time these contacts have been actuated the circuit will have been broken at the contact 15' of the master-controller, thereby introducing a resistance into the circuit between the storage battery and the master-controller. The circuit from the storage battery will then be as follows: starting from ground, through the storage battery to the train-conductor 14, through the circuit-breaker B to the train-conductor 15, thence through the conductor 24 to the resistance $R^c$, through the conductor 25 and by way of a conductor 12, which joins the conductor 25 to the two controllers, to the contact 12' of the master-controller, the circuit having been already closed at this point in the sixth position. The connections for this seventh position of the master-controller are shown in Fig. 4 of the drawings, in which the resistance $R^b$ is short-circuited and the storage battery disconnected from the motor-circuit, with the resistance $R^c$ inserted in circuit between it and the connection leading to the master-controller.

In position 8 of the power-switch of the master-controller the two motors M' and $M^2$ will be connected in multiple between trolley and ground, with the resistances R' and $R^7$ and the storage battery included in the motor-circuit. In the next position the storage battery will be shunted by a resistance $R^b$ and the two resistances $R^2$ and $R^3$ will be included in multiple with the resistances R' and $R^7$.

The next two positions of the master-controller operate only to cut out the resistance in series in the motor-circuit, and in position 11 the motor-circuit connections are those shown in Fig. 5 of the drawings.

In position 12 the storage-battery circuit will have been opened and the resistance $R^b$ short-circuited, as before, and in the last position of the controller the circuit will again have been opened at the contact 15', thus introducing resistance $R^c$ into the storage-battery circuit, the connections for this last position being shown in Fig. 6. The storage battery may thus be caused to take the place of a dead resistance during the time that the motors are accelerating, thereby utilizing energy that would otherwise be dissipated.

It is to be noted that when the motors are connected in series the storage battery is included directly in the motor-circuit, the battery being designed to take without injury the volume of current which flows when the motors are thus connected. In the first multiple position, however, the current flowing in the motor-circuit is substantially double that which flows when the motors are connected in series, and in order to prevent a greatly-increased flow through the storage battery a suitably-calculated resistance is connected in shunt thereto. Also it is to be noted that the master-controller operates to introduce the resistance $R^e$ into the circuit between the storage battery and the solenoids, which constitute the actuating-coils of the motor-controller, whenever by the operation of the master-controller the motor-controller has been brought into one of its "running" positions—that is, whenever the contacts of the motor-controller have been actuated to connect the motors either in full series or in full parallel. By thus introducing resistance in the actuating-circuit after the controller-contacts have been brought into a position in which it is desired that they shall remain the current in the actuating-coils may be reduced to such an amount as will be sufficient to maintain the various contacts in closed position, although not sufficient to operate the said contacts if they were open.

The controller C may of course be of any suitable construction; but I prefer to use the construction shown in my pending application, Serial No. 671,994.

The safety devices $w'$ and $w^2$ are contacts carried by the same structures that operate the motor-contacts, so that when the motor-contacts to which they are operatively related are closed the safety devices will be open, and vice versa. These devices are similar to those shown in my pending application above referred to, although they are in this application applied in a different connection; but their function is in both cases the same—namely, to prevent one circuit from being closed until another related circuit has been opened, or vice versa.

In the operation of my train-control system the storage batteries on all the cars of the train will be connected in multiple by the train-conductors 13 and 14 or by the train-conductor 14 and ground if the negative train-conductor be omitted, and although a circuit-breaker B is placed adjacent each of the master-controllers A only that circuit-breaker which is adjacent the master-controller at which the operator is stationed will be closed. Under these conditions if an excessive current-flow exists in any one of the motor-circuits on the train the coil $b$ of the overload device E on the particular car where the trouble exists will actuate the armature $a$ to close a circuit from the train-conductor 15 through the conductor $x$ to ground. When such a circuit is closed on any one of the cars of the train, a circuit will be closed from all the storage batteries through the train-conductor 14, through the contacts of that particular circuit-breaker B, which is in its closed position, through the tripping-coil of the said circuit-breaker to the train-conductor 15, and thence by way of conductor 26 on the car where the trouble exists to the armature $a$, conductor $x$ to ground, and to the other side of the storage batteries. When a negative train-conductor, as 14, is employed, the conductor $x$ may of course, if desired, be connected to said conductor instead of directly to ground, as shown. An excessive battery-current will therefore be caused to flow through the tripping-coil of the circuit-breaker B, and the same will be caused to open, thereby breaking the circuit between the storage batteries and the master-controller which is in operation and opening the motor-circuits at all the motor-controllers on the train.

Heretofore it has been customary to employ a circuit-breaker on each of the cars of the train in the main motor-circuit. With this arrangement an excessive current-flow in any one of the motor-circuits will cause the circuit-breaker in that particular circuit to open; but the operator has no means of knowing it, and on any grades where the total power of all the motors is necessary for proper operation of the system the remaining motors will be operating under an overload without the operator's being aware of the fact. By the arrangement above described I am enabled to dispense with a separate circuit-breaker in each motor-circuit, employing in its stead the circuit-breaker which would ordinarily be employed in the storage-battery circuit, (and which may be much smaller, because it has to break only the comparatively weak battery-current,) and breaking the main circuit at the controllers themselves. I am also enabled by this arrangement to indicate to the operator whenever an excessive current-flow exists on any of the cars of the train, so that he may be aware of the conditions and operate his train accordingly. It is evident that this feature of my invention does not necessarily involve the use of a storage battery for actuating the several motor-controllers.

In Figs. 7 and 8 I have shown the circuit connections for the circuit-breaker B and the controlling device E separate from the other parts of the system. In Fig. 7 the source of current-supply for the master-controller is a storage battery, the same as in Fig. 1, while in Fig. 8 the line itself is used as such source of supply.

The reversing-switches D on all of the cars of the train are operated from any one of the master reversing-switches RS. With the master-switch RS and the various motor-reversing switches D on the several cars of the train in the position shown in Fig. 1 of the drawings, if it is desired to operate the motor-reversing switches to reverse the motor connections the master reversing-switch will be operated to connect the fixed contacts 10' and 14' with each other. The circuit from the storage battery to the actuating-solenoids of the several reversing-switches on the train may then be traced as follows: Starting from ground or from negative train-conductor, through the various storage batteries to the train-conductor 14, by way of conductor 27 to fixed contact 14′, through the movable contacts of the master reversing-switch to the contact 10′, by way of conductor 28 to train-conductor 10, thence by way of conductor 29 on each of the cars of the train to fixed contact *e* on each of the reversing-switches D, and through the cross-connected movable contacts *h* on the reversing-switch cylinder to the fixed contact *f*, thence through the solenoid *k* to the brake-coil *m*, and by way of conductor 23 to ground. The current flowing through the coil *m* operates to release the friction-brake, which is shown as a bell-crank lever having one end engaging the surface of a disk carried by the shaft of the reversing-switch, and the solenoid *k* causes the reversing-switch to be thrown to its other extreme position, the contacts *h* passing out from under the contacts *e* and *f* just as the switch reaches the limit of its throw and the contacts *g* coming under the fixed contacts *c* and *d*. When the contacts *h* leave the corresponding fixed contacts *e* and *f*, the circuit from the storage battery through the solenoid *k* and the brake-coil *m* is broken, and the friction-brake will immediately be applied. If now it is desired to throw the reversing-switch back to its original position, it is only necessary to throw the master reversing-switch into the position connecting the fixed contacts 11′ and 14′, when a circuit will be closed from the storage battery through the master reversing-switch to the train-conductor 11 and through the contacts *c*, *d*, and *g* to the opposite solenoid *l*, and thence through the brake-coil *m* to ground, as before. It may happen, however, through the disarrangement of some one of the main reversing-switches of the train that the said switch will not throw to its extreme position, but will remain in an intermediate position. Whenever in an intermediate position, either the contacts *g* will be in engagement with the contacts *c* and *d* or else the contacts *h* will be in engagement with the contacts *e* and *f*, and under such conditions the circuit from the storage battery through one or the other of the actuating-coils of the reversing-switch will be closed, so that current will continue to flow through the master reversing-switch. In order to notify the operator whenever such trouble exists and in order to prevent the starting of the train until after the trouble has been remedied, I have provided a locking device L on each of the master-controllers, connected in circuit between the source of current for actuating the reversing-switches and the master reversing-switch, so that whenever current is flowing through the master controlling-switch to any one of the reversing-switches on the train the said locking device will be operated. This locking device I have shown in operative relation to the power-switch of the master-controller; but it is evident that it might be applied in any other desired connection, the essential feature being that some device shall be locked until the difficulty has been remedied. The locking device comprises a spool *s*, containing a winding through which the current flows in passing to the master reversing-switch, and this spool is keyed or otherwise fastened to the shaft of the power-switch of the master-controller. The lower flange of the spool *s* is provided with a notch (the flange being partly broken away to show the same) which in the off position of the power-switch of the master-controller lies opposite an armature *t*, pivoted on a fixed portion of the controller and normally held by means of a spring out of engagement with the notch in the said flange.

Whenever the reversing-switch of the master-controller is closed in either of its operative positions, current will continue to flow through the conductor 27 and the locking device L if any of the motor-reversing switches fail to operate. The locking device will then be energized and the armature *t* caused to engage the notch in the flange of the spool *s*, so that the power-switch of the master-controller will be locked in its off position, it being understood that the usual interlocking devices will be employed between the power and reversing switches of the master-controller, so that the reversing-switch cannot be moved until the power-switch has been brought to its off position.

The controlling and reversing switches of the motor-controller constitute what I have termed a "plurality of main switches," and the power and reversing switches of the master-controller constitute a plurality of master-switches for controlling the operation of the main switches.

In Fig. 9 I have diagrammatically illustrated the power and reversing switches of the master-controller, together with the locking device and a plurality of motor-reversing switches operatively connected to said master reversing-switch. In this figure one of the motor-reversing switches is shown in dotted lines in an intermediate position, with the contacts *g* still in engagement with the contacts *c* and *d*, from which it will be evident that the circuit will be closed through the locking device whenever such a condition exists.

In Fig. 10 I have shown a system substantially the same as that shown in Fig. 1 of the drawings; but in this figure I have omitted the overload device for operating the circuit-breaker B and have shown a circuit-breaker B′ in the main motor-circuit of each car, the circuit-breaker B being merely included in circuit between the several storage batteries and the master-controller which is being operated. The omission of the overload device reduces the number of train-conductors by one. Also, in this figure I have shown a somewhat different system of storage-battery connections, involving the insertion of the storage battery into one of the motor-circuits and an equivalent resistance into the other motor-circuit. This necessitates the use of an additional resistance $R^a$ and the insertion of another contact $8^h$ in the motor-controller.

In position 5 of the master-controller (shown in Fig. 10) the connections will be those shown in Fig. 11, with the motor $M'$, the resistance $R^a$, the motor $M^2$, and the storage battery SB connected in series across the line. In passing from position 5 to position 6 the storage battery will be shunted by a resistance $R^b$ preparatory to being cut out of the motor-circuit, as shown in Fig. 12. As soon as the fixed contact $9'$ of the master-controller passes off the corresponding movable contact the storage battery will be cut out of circuit and the resistances $R^a$ and $R^b$ short-circuited. In passing from position 6 to position 7, in which latter position the circuit connections are as indicated in Fig. 13, the resistance $R^c$ is inserted in the storage-battery circuit between it and the master-controller, the same as in the system shown in Fig. 1. In position 8 of the master-controller the two motors will be connected in multiple, with the storage battery in circuit with one of the motors and the equivalent resistance $R^a$ in circuit with the other, and in position 11 when the resistance has been cut out of the motor-circuit the circuit connections will be those shown in Fig. 14. In passing from position 11 to position 12 of the master-controller the resistance $R^b$ will first be shunted around the storage battery, as shown in Fig. 15, and when the fixed contact $9'$ of the master-controller passes off the corresponding movable contact the storage battery will be cut out of the motor-circuit and the resistances $R^a$ and $R^b$ short-circuited, and in the final position 13 the resistance $R^c$ will be inserted in series between the storage battery and the master-controller. The connections for this final position 13 are shown in Fig. 16. In other respects the system shown in Fig. 10 is the same as that shown in Fig. 1.

In the system shown in Fig. 1, as well as that shown in Fig. 10, there are certain positions of the master-controller in which the storage battery may be left for any desired time when the car or train is running at or near its normal speed. The connections for these positions of the master-controller are shown in Figs. 5 and 14. If, therefore, the stops made by the train are so frequent as to demand more energy for actuating the motor-controllers than can be supplied to the storage batteries during acceleration merely, the connections shown in Figs. 5 and 14 may be maintained for a sufficient time to properly charge the batteries, or if the energy required is excessive the position which makes these connections may be made the final position of the controller. In the systems shown in Figs. 1 and 10 I have shown but two motors; but it is evident that any number of motors might be used on each car, and with four or more motors, as with two, the storage battery might be maintained permanently in one of the motor-circuits with an equivalent resistance in circuit with each of the other motors, or it might be shunted by a suitable resistance in the last position of the controller by connections similar to those shown in Figs. 5 and 14.

In a train-control system employing a large number of train-conductors, one of which is connected to the positive side of the source from which the several motor-controllers are actuated and the others of which are connected through the actuating devices of the said motor-controllers to the other side of the source, there is danger, if the conductors are massed together, as is customary, that through abrasion or otherwise current may be supplied directly from the positive conductor to one or more of the train-conductors which lead to the motor-controllers without passing to the master-controller and some one of the contacts of the motor-controllers thereby be actuated and beyond the control of the operator. In order to prevent such an occurrence, I form all of the train-conductors into a single cable having, as illustrated in Figs. 17 and 18, a negative conductor $v$ between the positive conductor or conductors $w$ and the several train-conductors $z$, which are connected to the operating-solenoids of the motor-controllers, so that the negative conductor forms a negative armor surrounding the positive conductor and between it and the various conductors which convey the current to actuate the several contacts of the motor-controller. With this arrangement a short circuit can never occur between the positive conductor and any one of the conductors leading to the separate contacts of the motor-controller without grounding the positive conductor. It is therefore impossible for any of the various conductors leading to the motor-controllers to be energized by a short circuit to actuate the contacts of the motor-controllers. A fuse or circuit-breaker may be inserted between the source and the positive conductor, so that in case of short circuit the positive lead will be disconnected from the source before any damage is done.

I have described my invention as applied to a system of train control; but it is evident that it may be employed with any number of cars, one or more, and in certain of its features it is also evident that it is not limited to a railway system, but may be employed in any desired connection.

What I claim as new, and desire to secure by Letters Patent of the United States, is—

1. In combination, a source of current-supply, a motor or motors, a storage battery, a resistance, and a controlling device or switch in one position connecting said motors to said source in series with said storage battery, and in another position connecting said storage battery and said resistance in multiple between said motors and said source.

2. In combination, a source of current-supply, a plurality of motors, a storage battery, a resistance, and a controlling device or switch in one position connecting said motors to said source in series with each other and with said storage battery, and in another position connecting said storage battery and said resistance in multiple between said motors, also connected in multiple, and said source.

3. In combination, a source of current-supply, a plurality of electric motors, a storage battery, and a controlling device or switch for connecting said storage battery in series with said motors during acceleration, then shunting said storage battery by a resistance, and finally cutting out said storage battery and shunting said resistance.

4. In combination, an electric motor or motors, a controlling device comprising a plurality of separately-actutated contacts, electromagnets for actuating said contacts, a storage battery for supplying current to said electromagnets, and means for controlling said electromagnets to connect said storage battery in circuit with said motors during acceleration to charge the same.

5. In combination, an electric motor or motors, a controlling device for said motors, an electromagnet or electromagnets for actuating said controlling device, a storage battery for supplying current to said eltromagnets, and means for connecting said storage battery in circuit with said motors during acceleration to charge the same.

6. In combination, an electric motor or motors, a controlling device therefor, electromagnetic means for actuating said controlling device, a storage battery, means for connecting said electromagnetic means in circuit with said storage battery, and means for connecting said storage battery in series with said motors during acceleration.

7. In combination, an electric motor or motors, a controlling device therefor, electromagnetic means for actuating said controlling device, a storage battery, means for connecting said electromagnetic means in circuit with said storage battery, and means for connecting said storage battery in circuit with one or more of said motors to charge the same.

8. In combination, an electric motor or motors, a controlling device therefor, electromagnetic means for actuating said controlling device, a storage battery, means for connecting said electromagnetic means in circuit with said storage battery, means for connecting said storage battery in series with said motors during acceleration, and means for removing said storage battery from the motor-circuit.

9. In combination, a plurality of electric motors, a storage battery, a controlling device in one position connecting said storage battery in circuit with said motors for charging, electromagnetic means for actuating said controlling device, and a second controlling device for making circuit connections between said storage battery and said electromagnetic means.

10. In combination, an electric motor or motors, a storage battery, a controlling device in one position connecting said storage battery in circuit with said motor or motors, and means for supplying current from said storage battery to actuate said controlling device.

11. In combination, an electric motor or motors, a storage battery, a resistance, means for connecting said storage battery in circuit with said motor or motors, means for connecting said resistance in multiple with said storage battery, means for disconnecting said battery, and means for shunting said resistance.

12. In combination, a source of current-supply, a storage battery, a resistance, a controlling device in one position connecting the battery to said source, in a second position connecting the resistance in multiple to said battery, and in a third position disconnecting said battery and shunting said resistance, and means whereby the resistance cannot be shunted until after the battery has been disconnected.

13. In combination, a controlling device, electromagnetic actuating means therefor, a source of current-supply, a master-controller for controlling the supply of current to the said actuating means, a resistance, and contacts on the master-controller arranged to include said resistance in circuit with the source and the electromagnetic actuating means after the said controlling device has been actuated.

14. In combination, a switch, electromagnetic means for operating said switch, a source of supply, and a master-controller having its contacts arranged to first connect said electromagnetic means to said source, and thereafter to introduce a resistance in circuit therewith.

15. In combination, a switch, electromagnetic means for operating said switch, a source of supply, and a master-controller provided with contacts arranged to connect said electromagnetic means to said source and additional contacts arranged to thereafter introduce a resistance in circuit with said electromagnetic means.

16. In combination, a controller comprising a plurality of separately-actuated contacts, electromagnetic actuating means therefor, a source of current-supply, means for connecting said electromagnetic means in circuit with said source to operate the controller, and means for reducing the flow of current to said actuating means after a predetermined number of said controller-contacts have been actuated.

17. In combination, an electric motor or motors, a controller therefor comprising a plurality of separately-actuated contacts, electromagnetic means for operating said contacts in a predetermined order, a source for supplying current to said electromagnetic means, a circuit-breaker in circuit with said source and said electromagnetic means, and means operated by an excess flow of current in the motor-circuit for opening said circuit-breaker and thereby causing the motor-circuit to be opened at the said separately-actuated contacts.

18. In combination, an electric motor or motors, a controller therefor comprising a plurality of separately-actuated contacts, a source for supplying current to actuate said contacts, a master-controller controlling the application of current from said source, a circuit-breaking device in circuit with said source, and means operated by an excess flow of current in the motor-circuit for opening said circuit-breaking device and thereby causing the motor-circuit to be opened at the separately-actuated contacts.

19. In combination, a controlling device for electric motors comprising a plurality of separately-actuated contacts, electromagnetic means for operating said contacts, a source of current-supply, a master-controller for supplying current from said source to said electromagnetic means, a circuit-breaking device in circuit with said source and said master-controller, and automatically-operated means for actuating said circuit-breaking device to cut off the supply of current to said electromagnetic means and thereby to cause the motor-circuit to be opened at the separately-actuated contacts of the controlling device.

20. In a train system, the combination of a number of cars united to form a train, propelling-motors mounted upon more than one of said cars, controlling devices for said motors, electromagnetic means for controlling the operation of said devices, a source of current, a master-controller for connecting said electromagnetic means to said source, a circuit-breaking device in circuit between said source and said master-controller, and means controlled by the current in the motor-circuit on one or more of said cars for actuating said circuit-breaking device to cut off the supply of current to said electromagnetic means.

21. In a train system, the combination of a number of cars united to form a train, propelling-motors on one or more of said cars, controlling devices for said motors, electromagnetic means for securing the operation of said controlling devices, a source of current, a master-controller having electrical connections on the one side to said source and on the other to said electromagnetic means, a circuit-breaking device connected in circuit between said source and said master-controller so as to control the flow of current therethrough to the said electromagnetic means, and means arranged to be operated by an excess flow of current on any one of the motor-cars for actuating said circuit-breaking devices.

22. In a train system, the combination of a number of cars united to form a train, propelling-motors on one or more of said cars, controlling devices for said motors, electromagnetic means for securing the operation of said controlling devices, a source of current, a master-controller having electrical connections on the one side to said source and on the other to said electromagnetic means, an electrically-actuated circuit-breaking device connected in circuit between said source and said master-controller, train-conductors to which the actuating-winding of the said circuit breaking device is connected, and means on each motor-car arranged to be operated by an excess flow of current in the motors on that car for connecting the actuating-winding of said circuit-breaking device to a suitable source of supply.

23. In combination, an electric motor or motors, a controlling device therefor, a source for supplying current to actuate said controlling device, a master-controller controlling the application of current from said source, an indicating device in circuit with said source, and means controlled by the current in the motor-circuit for actuating said indicating device.

24. In a train system, the combination of a number of cars united to form a train, propelling-motors mounted upon more than one of said cars, controlling devices for said motors, electromagnetic means for controlling the operation of said devices, a source of current, a master-controller for connecting said electromagnetic means to said source, an indicating device in circuit with said source and said master-controller, and automatic means for actuating said indicating device.

25. In combination, an electric motor or motors, a motor-controller therefor, a master-controller for controlling the operation of the motor-controller, an indicating device adjacent to the master-controller, and means operated by an excess flow of current in the motor-circuit for closing a circuit to operate the indicating device.

26. In combination, an electric motor or motors, a motor-controller therefor, a master-controller for controlling the operation of the motor-controller, an indicating device adjacent to the master-controller, and a switch separate from the indicating device operated by an excess flow of current in the motor-circuit for securing the operation of the indicating device.

27. In a train system, the combination of a number of cars united to form a train, propelling-motors mounted upon more than one of said cars, motor-controllers on the several motor-cars, one or more master-controllers for controlling the operation of the several motor-controllers, indicating devices adjacent to the several master-controllers, and independent means operated by an excess flow of current in one or more of the motor-circuits for securing the operation of one or more of said indicating devices.

28. In a train system, the combination of a number of cars united to form a train, propelling-motors for said cars, reversing-switches for said motors, a master-controller comprising a power-switch and a reversing-switch, means for operating said master reversing-switch, and means operated upon the failure of any of the motor-reversing switches, for locking the power-switch of the master-controller.

29. In a train system, the combination of a number of cars united to form a train, propelling-motors for said cars, motor-controllers comprising a plurality of switching devices, a master-controller comprising a plurality of corresponding switching devices, means for operating one of the switching devices of the master-controller, and means operated upon the failure of any of the corresponding motor-switching devices for locking the other switching devices of the master-controller.

30. In combination, a motor-controller comprising a plurality of switching devices, a master-controller comprising a plurality of corresponding switching devices, means for operating one of the switching devices of the master-controller, and means controlled by the corresponding switching device of the motor-controller for locking the other switching devices of the master-controller.

31. In combination, a plurality of switches, a corresponding plurality of means for operating said switches, and a locking device controlled by one of said operating means and released only when the corresponding switch has been operated.

32. In combination, a plurality of main switches, a plurality of master-switches for controlling the operation of the main switches, and a locking device actuated upon the operation of one of said master-switches and released only when the corresponding main switch has been operated.

33. In combination, a main controller comprising a plurality of switches, a master-controller for controlling the operation of said switches, an electromagnetically-operated locking device in circuit with one of the switches of said master-controller, and means controlled by the corresponding main switch for operating said circuit.

34. In combination, a main controller comprising a plurality of switches, a master-controller comprising corresponding switches, and a locking device for said master-controller rendered operative by the failure of one of the switches of the main controller.

35. In combination in a master-controller, a power-switch, a reversing-switch, and an electromagnetic locking device for the power-switch connected in the circuit of the reversing-switch.

36. In combination, two controlling-switches, a switch adapted to be operated from one of the said controlling-switches, a locking device for the other controlling-switch, and means controlled by the switch to be operated for actuating said locking device.

37. In combination, a switch to be operated, electromagnetic means for operating said switch, a master-switch, a circuit connecting said master-switch and said electromagnetic means, a locking device, electromagnetic means for actuating said locking device included in said circuit, and means controlled by the switch to be operated for opening said circuit.

38. In combination, a master-controller comprising power and reversing switches, a motor-controller comprising corresponding switches, electromagnetic means for operating the switches of said motor-controller, an electromagnetic locking device on the shaft of the power-switch, and means controlled by the reversing-switch of the motor-controller for actuating said locking device.

39. In combination, a master-controller, an electrically-actuated motor-controller, and a cable extending between the motor-controller-actuating means and the master-controller, said cable comprising a positive conductor, a negative conductor insulated from said positive conductor, and a plurality of conductors for the controller-actuating circuits insulated from each other and from the negative conductor.

40. In combination, a master-controller, an electrically-actuated motor-controller, and a composite conductor extending between the motor-controller-actuating means and the master-controller, the said conductor comprising a positive conductor or conductors, a plurality of conductors for the controller-actuating circuits, a negative conductor or conductors interposed between said positive conductor and said train-conductors, and insulating material separating said conductors from each other.

41. In combination, a master-controller, an electrically-actuated motor-controller, and a composite conductor extending between the motor-controller-actuating means and the master-controller, the said composite conductor comprising a positive conductor or conductors, a plurality of auxiliary conductors for the controller-actuating circuits, and a negative conductor or conductors interposed between said positive and said auxiliary conductors.

42. In combination, in a motor-controller, a coil on the controller-shaft, a movable armature constituting a locking device arranged in the field of said coil, and a spring acting upon said device in opposition to the field generated by said coil.

43. In combination, in a motor-controller, a coil surrounding the controller-shaft, a movable armature constituting a locking device arranged to be actuated by the field generated by said coil, a coöperating member upon the controller-shaft, and a spring acting to normally maintain said armature out of engagement with its coöperating member on the controller-shaft.

In witness whereof I have hereunto set my hand this 9th day of February, 1900.

FRANK E. CASE.

Witnesses:
BENJAMIN B. HULL,
MABEL E. JACOBSON.